United States Patent
Wang et al.

(10) Patent No.: US 11,343,360 B2
(45) Date of Patent: May 24, 2022

(54) PACKET AGGREGATION AND DISAGGREGATION METHOD

(71) Applicant: NATIONAL CHIAO TUNG UNIVERSITY, Hsinchu (TW)

(72) Inventors: Shie-Yuan Wang, Hsinchu (TW); Jun-Yi Li, Kaohsiung (TW); Yi-Bing Lin, Hsinchu (TW)

(73) Assignee: NATIONAL CHIAO TUNG UNIVERSITY, Hsinchu (TW)

( * ) Notice: Subject to any disclaimer, the term of this patent is extended or adjusted under 35 U.S.C. 154(b) by 0 days.

(21) Appl. No.: 17/125,975

(22) Filed: Dec. 17, 2020

(65) Prior Publication Data
US 2022/0060569 A1  Feb. 24, 2022

(30) Foreign Application Priority Data
Aug. 18, 2020   (TW) .................................. 109128138

(51) Int. Cl.
*H04L 49/90*    (2022.01)
*H04L 49/25*    (2022.01)
*H04L 69/22*    (2022.01)
*G16Y 10/75*    (2020.01)

(52) U.S. Cl.
CPC .............. *H04L 69/22* (2013.01); *G16Y 10/75* (2020.01); *H04L 49/25* (2013.01); *H04L 49/90* (2013.01)

(58) Field of Classification Search
CPC ....... H04L 47/36; H04L 69/22; H04L 69/166; H04L 49/25; H04L 49/90; H04L 67/12; H04L 2012/5652; G16Y 10/75
See application file for complete search history.

(56) References Cited

U.S. PATENT DOCUMENTS

| | | |
|---|---|---|
| 6,614,808 B1 | 9/2003 | Gopalakrishna |
| 7,120,852 B2 | 10/2006 | Terry et al. |
| 7,391,769 B2 | 6/2008 | Rajkumar et al. |

(Continued)

FOREIGN PATENT DOCUMENTS

| | | |
|---|---|---|
| TW | 200822652 A | 5/2008 |
| TW | I690185 B | 4/2020 |
| WO | 2018125462 A1 | 7/2018 |

OTHER PUBLICATIONS

Kyungtae Kim et al., "On Packet Aggregation Mechanisms for Improving VoIP Quality in Mesh Networks", 2006 IEEE 63rd Vehicular Technology Conference, May 7-10, 2006, pp. 891-895.

(Continued)

*Primary Examiner* — Mohamed A Kamara
(74) *Attorney, Agent, or Firm* — CKC & Partners Co., LLC

(57) ABSTRACT

The present disclosure provides packet aggregation and disaggregation methods. In the packet aggregation methods, the protocol-independent packet processor (P4) switch stores plural message headers of plural packets in the ring buffer. When the plural message headers stored in the ring buffer reach a pre-defined amount of data, the P4 switch replaces the first flag header in the current packet with a second flag header so as to form a work packet. The egress pipeline of the P4 switch recirculates the work packet repeatedly, whenever it receives a work packet, a message header is extracted from a plurality of message headers in the ring buffer and added to the working packet for packet aggregation.

10 Claims, 6 Drawing Sheets

(56) References Cited

U.S. PATENT DOCUMENTS

| | | | |
|---|---|---|---|
| 8,175,116 B2 * | 5/2012 | Tachibana | H04L 47/10 370/470 |
| 9,655,004 B2 | 5/2017 | Yu et al. | |
| 2007/0299987 A1 | 12/2007 | Parker et al. | |
| 2008/0253398 A1 | 10/2008 | Calvignac et al. | |
| 2010/0158015 A1 | 6/2010 | Wu | |
| 2016/0380922 A1 | 12/2016 | Gross, IV et al. | |
| 2018/0191642 A1 | 7/2018 | Biederman et al. | |
| 2020/0099618 A1 * | 3/2020 | Bosshart | H04L 45/54 |
| 2020/0349080 A1 * | 11/2020 | Radi | G06F 12/0862 |
| 2020/0351370 A1 * | 11/2020 | Radi | G06F 12/082 |

OTHER PUBLICATIONS

Boris Bellalta et al., "On the performance of packet aggregation in IEEE 802.11 ac MU-MIMO WLANs", IEEE Communications Letters, vol. 16, No. 10, Oct. 2012, pp. 1588-1591.

Shie-Yuan Wang et al., "High-speed data-plane packet aggregation and disaggregation by P4 switches", Journal of Network and Computer Applications 142 (2019), pp. 98-110, May 17, 2019.

Shie-Yuan Wang et al., "Aggregating and Disaggregating Packets with Various Sizes of Payload in P4 Switches at 100 Gbps Line Rate", Journal of Network and Computer Applications 165 (2020) 102676, 15 pages, May 19, 2020.

* cited by examiner

PACKET AGGREGATION AND DISAGGREGATION METHOD

RELATED APPLICATIONS

This application claims priority to Taiwan Patent Application No. 109128138, filed Aug. 18, 2020, the entirety of which is herein incorporated by reference.

BACKGROUND

Field of Invention

The present invention relates to methods, and more particularly, packet aggregation and disaggregation methods.

Description of Related Art

Internet of Things (IoT) technology is developing rapidly and is widely used in various places in smart cities. Since the number of bytes of these sensing and activation data is very small, the network will be flooded with a huge number of these small packets to transmit the sensing and activation data in the future.

When a huge number of these IoT small packets are transmitted on the Internet, they must include the headers of the Ethernet, Internet Protocol (IP), and User Datagram Protocol (UDP) layers. Relative to the tiny length of data carried in each packet, the bytes of these headers will account for a high proportion of the total bytes of the entire packet, and therefore a high proportion of network bandwidth resources will be wasted in transmitting these packet headers. The length of the Ethernet header is 14 bytes, the length of the IP header is 20 bytes and the length of the UDP header is 8 bytes. These headers add to 42 bytes. If each IoT small packet only carried 16 bytes of data (i.e., payload), these headers would occupy 42/(42+16)=72% of the packet length, which means that 72% of the network bandwidth will be wasted In the non-data part.

The traditional method of setting up additional servers to execute software programs with a central processing unit (CPU) to perform packet aggregation and disaggregation, but the performance is very low.

Although there are previous technologies that can implement the function of packet aggregation in the switch, only packets of the same size and fixed length can be aggregated, and the number of packets is limited to a fixed number. Thus, when the lengths of the packets flowing through the switch are longer or shorter, the previous technologies cannot handle this situation; however, this situation is a common situation in real network.

SUMMARY

In one or more various aspects, the present disclosure is directed to packet aggregation and disaggregation methods.

An embodiment of the present disclosure is related to a packet aggregation method for a Programming Protocol-Independent Packet Processor (P4) switch, and the packet aggregation method includes steps of: receiving a plurality of packets by the P4 switch, and the plurality of packets being transmitted to an ingress parser of an ingress pipeline of the P4 switch; parsing each of the plurality of packets to an Ethernet header, an IP header, a UDP header, a type header, a first flag header and a message header by using a parse graph pre-defined in a switch configuration of the P4 switch, and the message header representing data payload of the packet and length information thereof; storing the message headers of the plurality of packets in the ring buffer of the P4 switch by using a match-action table defined in the switch configuration of the P4 switch; when the message headers stored in the ring buffer reach a pre-defined amount of data, using the P4 switch to replace the first flag header in a current packet with a second flag header so as to form a work packet; recirculating the work packet to the ingress parser repeatedly, whenever the P4 switch receives the work packet, extracting one message header from the message headers in the ring buffer, adding the one message header to the working packet for packet aggregation, and updating an amount and length of the message headers of the working packet to the second flag header; and when a data volume of the working packet reaches a pre-defined upper limit, using the working packet to serve as an aggregated packet, and outputting the aggregated packet through the egress pipeline of the P4 switch.

In one embodiment of the present disclosure, the number of the working packets is plural for performing the packet aggregation in parallel.

In one embodiment of the present disclosure, the packet aggregation method further includes steps of: whenever the message header to be stored is into the ring buffer of the P4 switch, storing the message header in a field of the ring buffer, wherein the field is indicated by an enqueue pointer of the match-action table.

In one embodiment of the present disclosure, the packet aggregation method further includes steps of: when the field of the ring buffer that is indicated by the enqueue pointer has stored data, adding information of indicating the field to the packet corresponding to the message header to be stored, and then resubmitting the packet from an ingress deparser to the ingress parser repeatedly until the stored data are removed from the field.

In one embodiment of the present disclosure, the packet aggregation method further includes steps of: whenever recirculating the work packet to the ingress parser, extracting the one message header from a field of the ring buffer, adding the one message header to the working packet, wherein the field is indicated by an dequeue pointer of the match-action table.

In one embodiment of the present disclosure, the packets include sensing data collected by a plurality of IoT devices.

In one embodiment of the present disclosure, the IoT devices connect with the P4 switch.

Another embodiment of the present disclosure is related to a packet disaggregation method for a P4 switch, and the packet disaggregation method includes steps of: receiving an aggregated packet by the P4 switch, the aggregated packet being transmitted to an ingress parser of an ingress pipeline of the P4 switch; parsing the aggregated packet to an Ethernet header, an IP header, a UDP header, a type header, a second flag header and a plurality of message headers by using a parse graph pre-defined in a switch configuration of the P4 switch, and the second flag header representing the number and length of the plurality of message headers; cloning the Ethernet header, the IP header, the UDP header, the type header, the second flag header and a first message header of the plurality of message headers from the aggregated packet, and replacing the cloned second flag header with a first flag header, so as to disaggregate a packet from the aggregated packet, and the packet comprising the Ethernet header, the IP header, the UDP header, the type header, the first flag header and the first message header; and deleting the first message header from the aggregated packet, modifying the second flag header for representing the number and length of the other of message headers, and recirculating the aggregated packet to the ingress pipeline, so as to disaggregate a next packet from the aggregated packet.

In one embodiment of the present disclosure, the packet disaggregation method further includes steps of: when the number of the plurality of message headers is more than two, deleting the first message header from the aggregated packet, modifying the second flag header for representing the number and length of the other of message headers, and recirculating the aggregated packet to the ingress pipeline.

In one embodiment of the present disclosure, the packet disaggregation method further includes steps of: when the number of the plurality of message headers is equal to two, deleting the first message header from the aggregated packet, and replacing the second flag header with the first flag header, so that the aggregated packet having the first flag header serves as the next packet, without recirculating the aggregated packet to the ingress pipeline.

Technical advantages are generally achieved, by embodiments of the present disclosure. With the solution of the present disclosure, the proportion of wasted network bandwidth of transmitting packet headers is reduced, and extremely high packet aggregation performance is obtained. In addition, the solution of the present disclosure does not need to limit the length of each of the small packets to be aggregated and the number of small packets in one large packet (i.e., the aggregated packet). Since the solution of the present disclosure is designed and implemented on hardware, compared to the traditional method of using the CPU of a server to execute software program to perform packet aggregation and disaggregation, the efficacy of the method of the present disclosure in the packet aggregation and disaggregation can be improved about dozens of times.

Many of the attendant features will be more readily appreciated, as the same becomes better understood by reference to the following detailed description considered in connection with the accompanying drawings.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
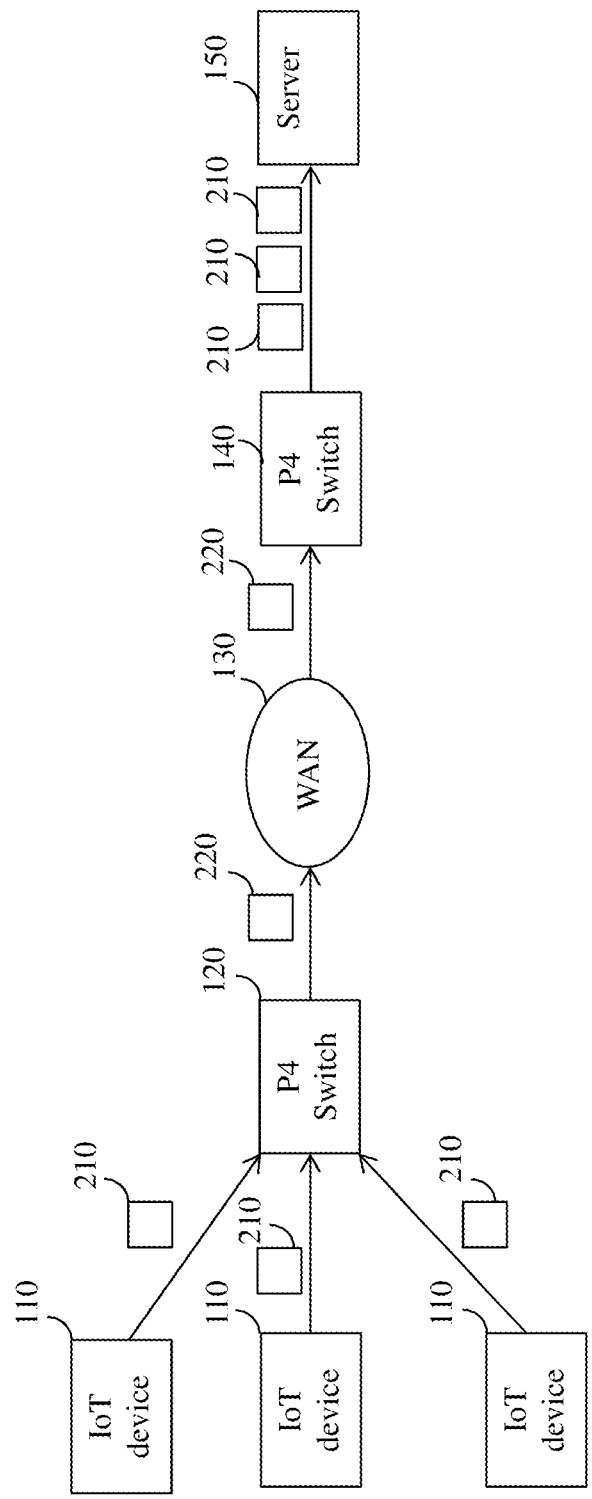
FIG. 1 is a block diagram of a packet aggregation and disaggregation system according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram of a packet aggregation and disaggregation system according to one embodiment of the present disclosure. As shown in FIG. 1, IoT devices 110 connect with a P4 switch 120. The IoT devices 110 transmit packets 210 to the P4 switch 120. The packet 210 is a small packet, which includes sensing data collected by the IoT devices 110. The P4 switch 120 aggregates small packets into a larger packet (i.e., an aggregated packet 220). This larger aggregated packet 220 can be transmitted through the WAN 130. When the aggregated packet 220 reaches the P4 switch, the aggregated packet 220 is disaggregated into the original packets 210. The server 150 performs subsequent operations on the data in the packets 210.

Figure 2:
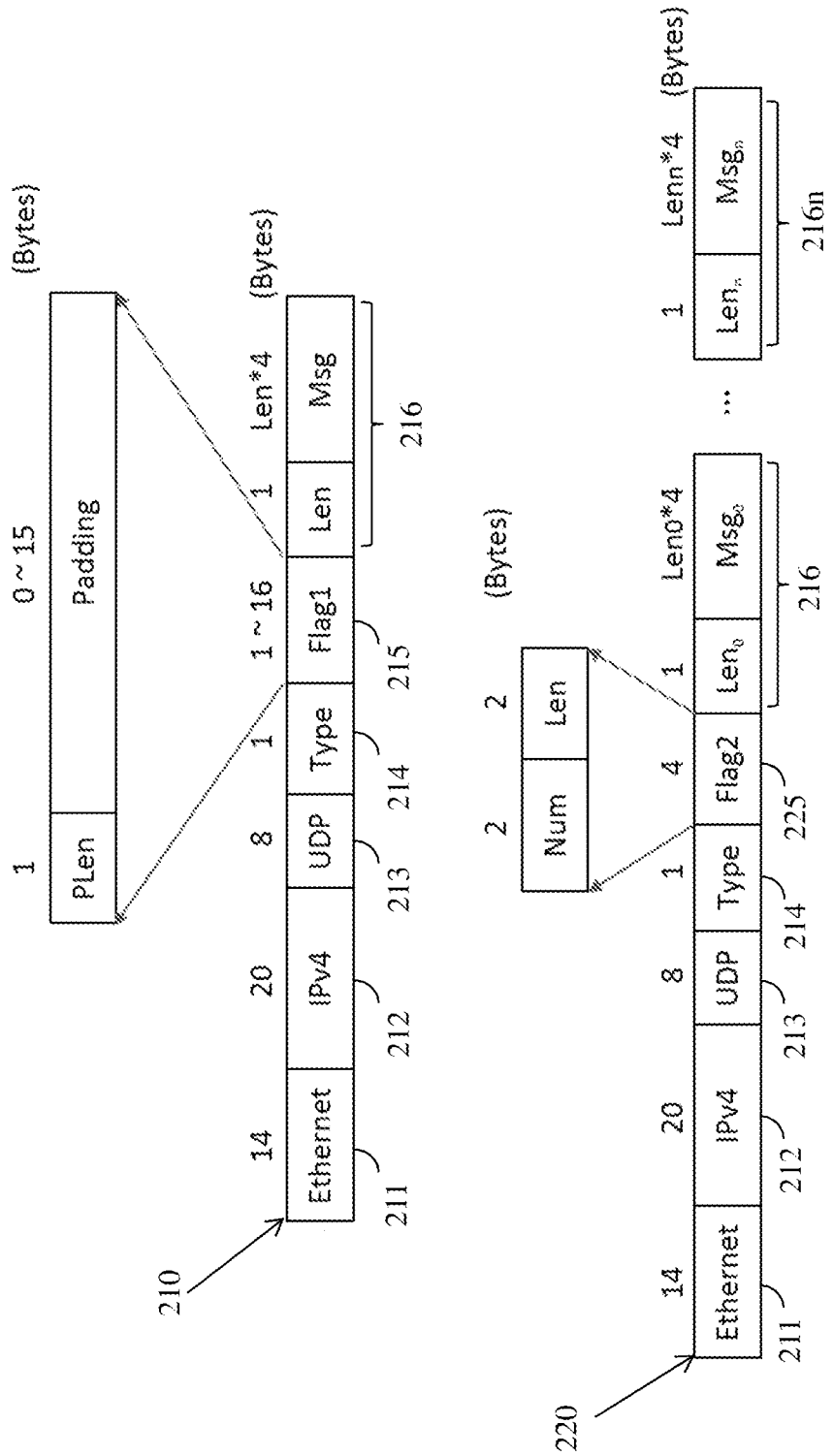
FIG. 2 is a schematic diagram of the packet format of a packet and an aggregated packet according to one embodiment of the present disclosure.

For a more complete understanding of the packet 210 and the aggregated packet 220, refer FIGS. 1-2. FIG. 2 is a schematic diagram of the packet 210 and the aggregated packet 220 according to one embodiment of the present disclosure. As shown in FIG. 2, the packet 210 includes an Ethernet header 211, an IP header 212, a UDP header 213, a type header 214, a first flag header 215 and a message header 216. In the present disclosure, the payload of the packet is regarded as a header (i.e., the message header 216), so that the payload can be extracted, stored and aggregated. The payload is data carried in the packet.

The aggregated packet 220 includes the Ethernet header 211, the IP header 212, the UDP header 213, the type header 214, a second flag header 225 and a plurality of message headers 216-216n, and the second flag header 225 represents the number and length of the plurality of message headers 216-216n. The message headers 216-216n are the payloads in the packets 210.

Figure 3:
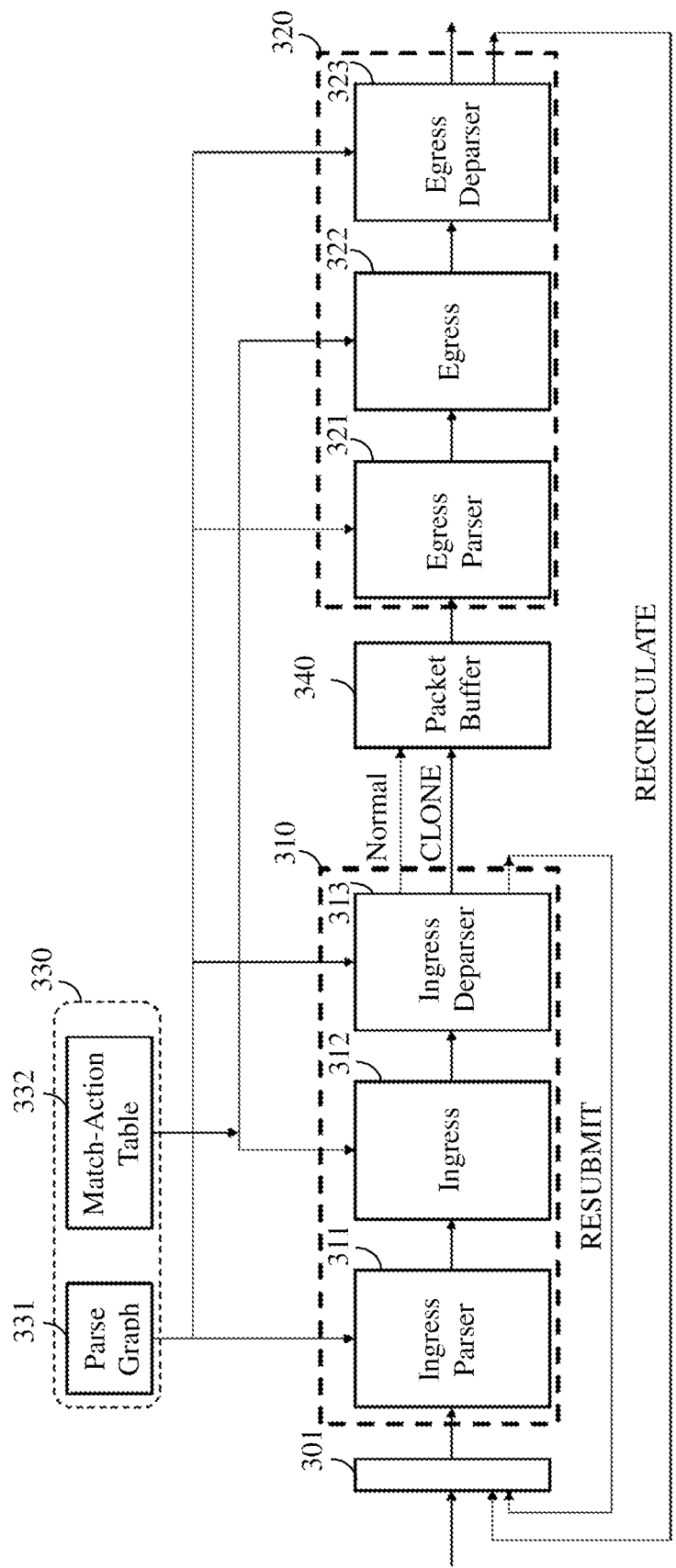
FIG. 3 is a block diagram of a P4 switch according to one embodiment of the present disclosure.

For a more complete understanding of the hardware of the P4 switch, refer FIGS. 1-3. FIG. 3 is a block diagram of the P4 switch according to one embodiment of the present disclosure. In practice, the structure of the P4 switch of FIG. 3 can be used in the P4 switch 120 and/or he P4 switch 140 of FIG. 1.

As shown in FIG. 3, the P4 switch includes an input port 301, an ingress pipeline 310, an egress pipeline 320, a switch configuration 330 and a packet buffer 340. In structure, the input port 301 connects to the ingress pipeline 310, the ingress pipeline 310 connects to the switch configuration 330 and the packet buffer 340, and the packet buffer 340 connects to the egress pipeline 320.

The ingress pipeline 310 includes an ingress parser 311, an ingress 312 and an ingress deparser 313. The ingress 312 connects to the ingress parser 311 and the ingress deparser 313. The egress pipeline 320 includes an egress parser 321, an egress 322 and an egress deparser 323. The egress 322 connects to the egress parser 321 and the egress deparser 323. The switch configuration 330 includes a parse graph 331 and a match-action table 332.

In the present disclosure, the packet aggregation and disaggregation are designed and implemented in the hardware pipelines of the P4 switch, and are completely completed in the data plane. Therefore, the packet aggregation can reach 100 Gbps line rate.

Figure 4:
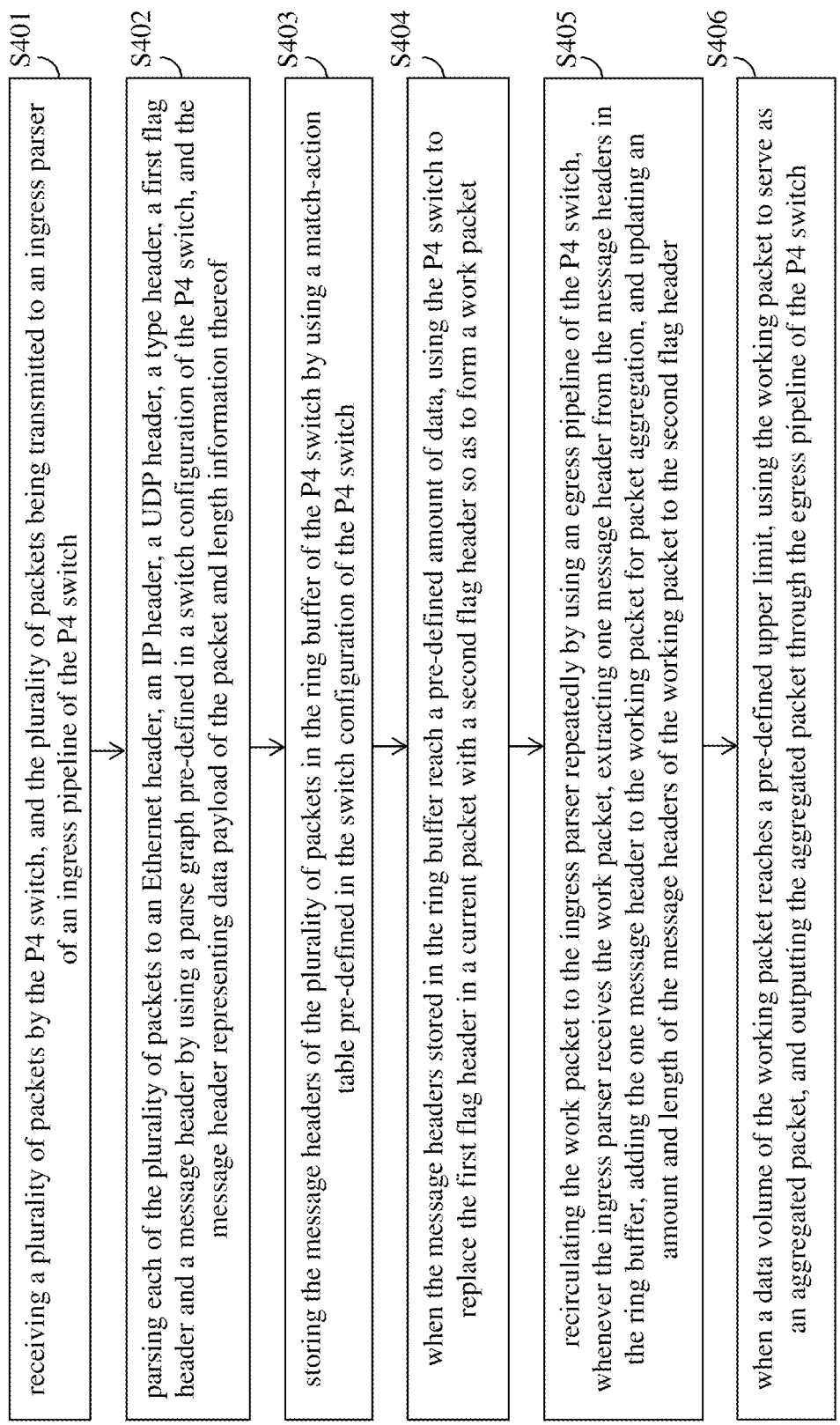
FIG. 4 is a flow chart of a packet aggregation method according to one embodiment of the present disclosure.

For a more complete understanding of a packet aggregation method, referring FIGS. 1-4, FIG. 4 is a flow chart of a packet aggregation method according to one embodiment of the present disclosure. In practice, the packet aggregation method is adapted to the P4 switch 120. As shown in FIG. 4, the packet aggregation method includes operations S401-S408. However, as could be appreciated by persons having ordinary skill in the art, for the steps described in the present embodiment, the sequence in which these steps is performed, unless explicitly stated otherwise, can be altered depending on actual needs; in certain cases, all or some of these steps can be performed concurrently.

In operation S401, a plurality of packets 210 are received by the P4 switch 120, and the plurality of packets 120 are transmitted to the ingress parser 311 of the ingress pipeline 310 of the P4 switch 120.

In operation S402, each of the plurality of packets 210 is parsed to the Ethernet header 211, the IP header 212, the UDP header 213, the type header 214, the first flag header 215 and the message header 216 by using the parse graph 331 pre-defined in the switch configuration 330 of the P4 switch 120, and the message header 216 represents data payload of the packet 210 and length information thereof.

In operation S403, the message headers 216 of the plurality of packets 210 are stored in the ring buffer 500 (shown in FIG. 5) of the P4 switch 120 by using the match-action table 332 pre-defined in the switch configuration 330 of the P4 switch 120.

In operation S404, when the message headers 216 stored in the ring buffer 500 reach a pre-defined amount of data, the P4 switch 120 is used to replace the first flag header 215 in a current packet 210 with the second flag header 225 so as to form a work packet. In practice, those with ordinary skill in the art may flexibly set a value of the pre-defined amount of data depending on the desired application.

In operation S405, the work packet is recirculated to the ingress parser 311 repeatedly by using the egress pipeline 320 of the P4 switch 120. Whenever the ingress parser 311 receives the work packet, extracts one message header 216 from the message headers in the ring buffer 500, the one message header 216 is added to the working packet for packet aggregation, and the amount and length of the message headers of the working packet are updated to the second flag header 225.

During the work packet is recirculated repeatedly, in operation S406, when a data volume of the working packet reaches a pre-defined upper limit, the working packet is used to serve as the aggregated packet 220, and the aggregated packet 220 is outputted through the egress pipeline 320 of the P4 switch 120. In practice, the pre-defined upper limit may be the rated upper limit of the amount of packet data in the communication protocol.

In one embodiment of the present disclosure, the number of the working packet is one only. Alternatively, in another embodiment of the present disclosure, the number of the working packets is plural for performing the packet aggregation in parallel, so as to improve the performance of the packet aggregation.

Figure 5:
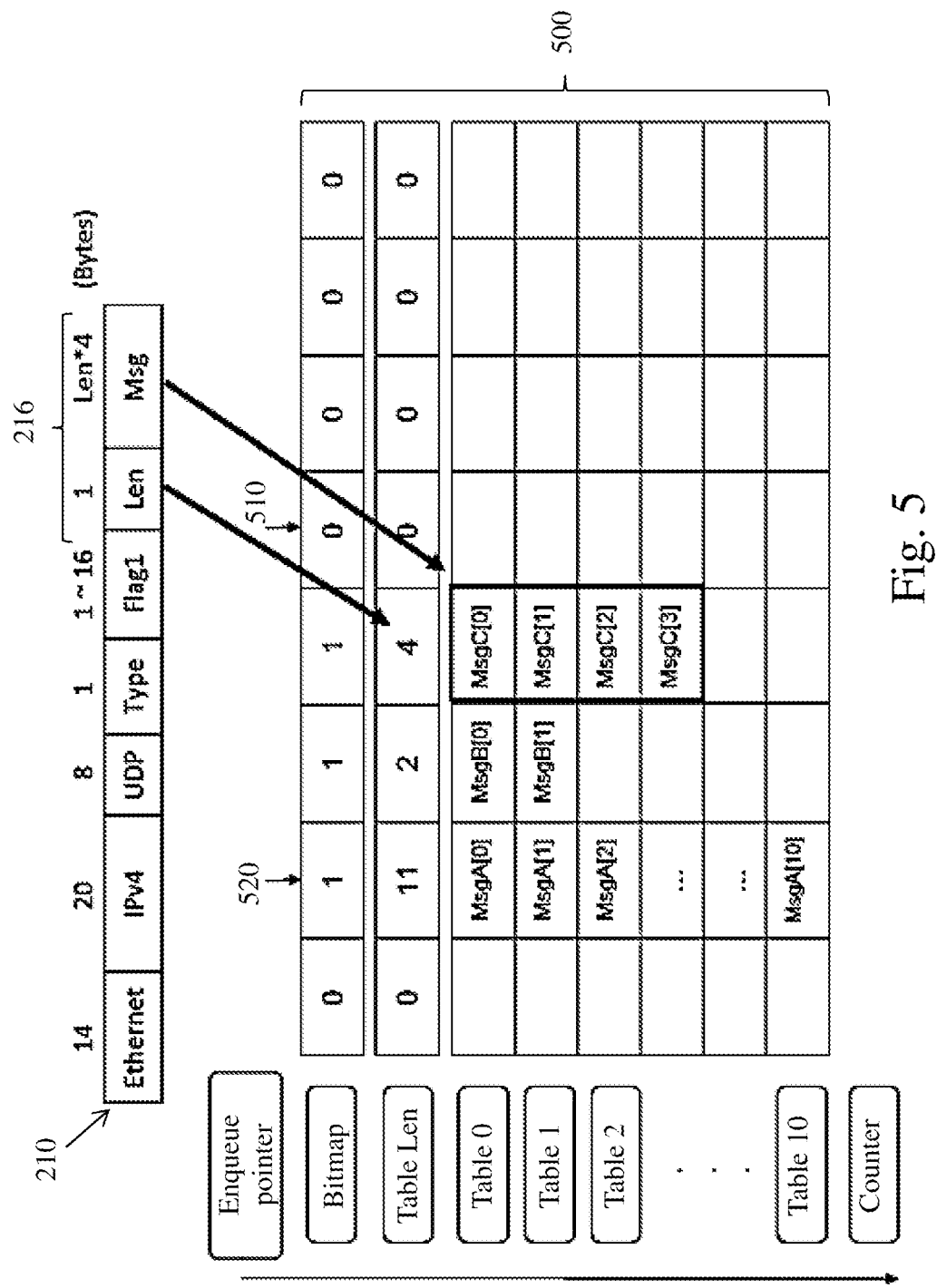
FIG. 5 is a schematic diagram of a ring buffer according to one embodiment of the present disclosure.

For a more complete understanding of a packet aggregation method, referring FIGS. 1-5, FIG. 5 is a schematic diagram of the ring buffer 500 according to one embodiment of the present disclosure. As shown in FIG. 5, the data payload of the message header 216 in the packet 210 is 16 bytes for example. Since each temporary storage block in Table 0 to Table 10 can only store 4 bytes, the data payload occupies four tables. The length information of the data payload is recorded in the "table len" that value 4 means four tables. The counter 530 can accumulate the data amount of the total bytes of all message headers in the ring buffer 500. When the pre-defined amount of data is reached, the first flag header 215 in the current packet is replaced with the second flag header 225, so as to form the work package.

The bitmap of the occupied field in the ring buffer 500 is "1"; the bitmap of the unoccupied field in the ring buffer 500 is "0". During the ring buffer 500 operates, when a field is occupied by the message header, the enqueue pointer 510 of the queue pointers points to the next field that is not occupied by the message header. When the message header of a field has been taken out, the dequeue pointer 520 of the queue pointer points to the next field that is occupied by the message header.

In one embodiment of the present disclosure, whenever the message header that is waited to be stored is into the ring buffer 500 of the P4 switch 120, the message header is stored in a field of the ring buffer 500, where the field is indicated by the enqueue pointer 510 of the match-action table 332.

In one embodiment of the present disclosure, whenever the work packet is recirculated to the ingress parser 311 by using the egress pipeline 320, one message header is extracted from a field of the ring buffer 500, the one message header is added to the working packet, where the field is indicated by the dequeue pointer 520 of the match-action table 323.

In practice, if the storage rate of the message header is fast than the extracting rate of the message header in the ring buffer 500, the enqueue pointer 510 may point to a field that is occupied by the message header. Accordingly, in one embodiment of the present disclosure, when the field of the ring buffer that is indicated by the enqueue pointer 510 has stored data, information of indicating the field is added to the packet corresponding to the message header that is waited to be stored. Then, the packet is resubmitted from the ingress deparser 313 to the ingress parser 311 repeatedly until the stored data are removed from the field. During the packet is resubmitted, a new field indicated by the enqueue pointer 510 can be omitted every time because the packet has the information of indicating the field. Once the stored data are removed from the field, the message header can be stored in the field, so as to avoid packet loss.

Figure 6:
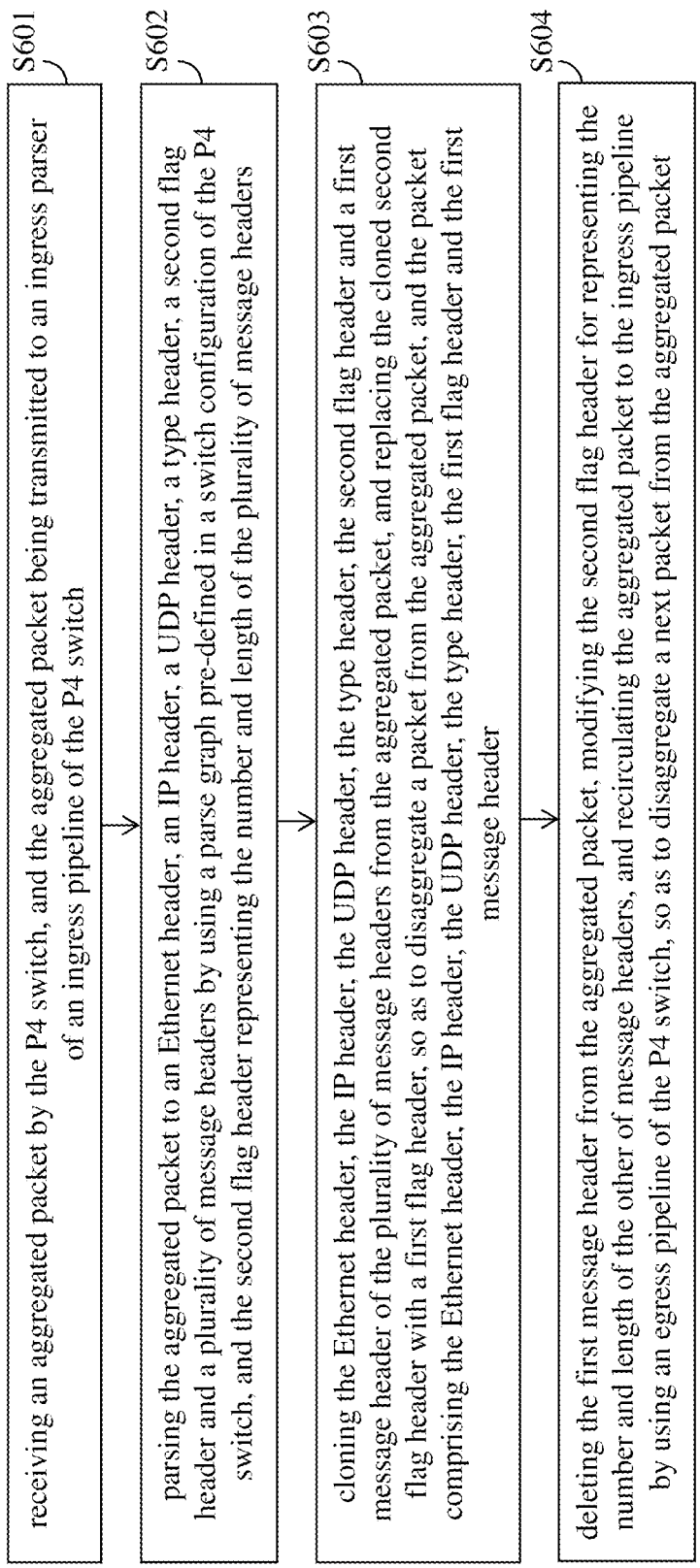
FIG. 6 is a flow chart of a packet disaggregation method according to one embodiment of the present disclosure.

For a more complete understanding of a packet disaggregation method, referring FIGS. 1-3 and 6, FIG. 6 is a flow chart of a packet disaggregation method according to one embodiment of the present disclosure. In practice, the packet aggregation method is adapted to the P4 switch 140. As shown in FIG. 6, the packet disaggregation method includes operations S601-S604. However, as could be appreciated by persons having ordinary skill in the art, for the steps described in the present embodiment, the sequence in which these steps is performed, unless explicitly stated otherwise, can be altered depending on actual needs; in certain cases, all or some of these steps can be performed concurrently.

In operation S601, the aggregated packet 220 is received by the P4 switch 140, the aggregated packet 220 is transmitted to the ingress parser 311 of the ingress pipeline 310 of the P4 switch 140.

In operation S602, the aggregated packet 220 is parsed to the Ethernet header 211, the IP header 212, the UDP header 213, the type header 214, the second flag header 225 and the plurality of message headers 216-216n by using the parse graph 331 pre-defined in the switch configuration 330 of the P4 switch 140, and the second flag header 225 represents the number and length of the plurality of message headers 216-216n.

In operation S603, the Ethernet header 211, the IP header 212, the UDP header 213, the type header 214, the second flag header 225 and a first message header 216 of the plurality of message headers 216-216n are cloned from the aggregated packet 220, and the cloned second flag header 225 is replaced with the first flag header 215, so as to disaggregate a packet 210 from the aggregated packet 220. The packet 210 includes the Ethernet header 211, the IP header 212, the UDP header 213, the type header 214, the first flag header 215 and the first message header 216.

In operation S604, the first message header 216 is deleted from the aggregated packet 220, the second flag header 225 is modified for representing the number and length of the other of message headers, and the aggregated packet 220 is recirculated to the ingress pipeline 310 by using the egress pipeline 320 of the P4 switch 140, so as to disaggregate a next packet from the aggregated packet 220.

In one embodiment of the present disclosure, when the number of the plurality of message headers 216-216n is more than two, the first message header is deleted from the aggregated packet 220, the second flag header 225 is modified for representing the number and length of the other of message headers, and the aggregated packet 220 is recirculated to the ingress pipeline 310 by using the egress pipeline 320 of the P4 switch 140.

In one embodiment of the present disclosure, when the number of the plurality of message headers 216-216n is equal to two, the first message header 216 is deleted from the aggregated packet 220, and the second flag header is replaced with the first flag header 215, so that the aggregated packet 220 having the first flag header 215 can serve as the next packet, without recirculating the aggregated packet 220 to the ingress pipeline 310 by using the egress pipeline 320 of the P4 switch 140.

Technical advantages are generally achieved, by embodiments of the present disclosure. With the solution of the present disclosure, the proportion of wasted network bandwidth of transmitting packet headers is reduced, and extremely high packet aggregation performance is obtained. In addition, the solution of the present disclosure does not need to limit the length of each of the small packets to be aggregated and the number of small packets in one large packet (i.e., the aggregated packet). Since the solution of the present disclosure is designed and implemented on hardware, compared to the traditional method of using the CPU of a server to execute software programs to perform packet aggregation and disaggregation, the efficacy of the method of the present disclosure in the packet aggregation and disaggregation can be improved about dozens of times.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A packet aggregation method for a Programming Protocol-Independent Packet Processor (P4) switch, and the packet aggregation method comprising following steps of:
   receiving a plurality of packets by the P4 switch, and the plurality of packets being transmitted to an ingress parser of an ingress pipeline of the P4 switch;
   parsing each of the plurality of packets to an Ethernet header, an IP header, a UDP header, a type header, a first flag header and a message header by using a parse graph pre-defined in a switch configuration of the P4 switch, and the message header comprising data payload of the packet and length information thereof;
   storing the message headers of the plurality of packets in a ring buffer of the P4 switch by using a match-action table pre-defined in the switch configuration of the P4 switch;
   when the message headers stored in the ring buffer reach a pre-defined amount of data, using the P4 switch to replace the first flag header in a current packet with a second flag header so as to form a work packet;
   recirculating the work packet to the ingress parser repeatedly by using an egress pipeline of the P4 switch, whenever the ingress parser receives the work packet, extracting one message header from the message headers in the ring buffer, adding the one message header to the working packet for packet aggregation, and updating an amount and length of the message headers of the working packet to the second flag header; and
   when a data volume of the working packet reaches a pre-defined upper limit, using the working packet to serve as an aggregated packet, and outputting the aggregated packet through the egress pipeline of the P4 switch.

2. The packet aggregation method of claim 1, wherein the number of the working packets is plural for performing the packet aggregation in parallel.

3. The packet aggregation method of claim 1, further comprising:
   whenever the message header is into the ring buffer of the P4 switch, storing the message header in a field of the ring buffer, wherein the field is indicated by an enqueue pointer of the match-action table.

4. The packet aggregation method of claim 3, further comprising:
   when the field of the ring buffer that is indicated by the enqueue pointer has stored data, adding information of indicating the field to the packet corresponding to the message header to be stored, and then resubmitting the packet from an ingress deparser to the ingress parser repeatedly until the stored data are removed from the field.

5. The packet aggregation method of claim 1, further comprising:
whenever recirculating the work packet to the ingress parser by using the egress deparser, extracting the one message header from a field of the ring buffer, adding the one message header to the working packet, wherein the field is indicated by a dequeue pointer of the match-action table.

6. The packet aggregation method of claim 1, wherein the plurality of packets comprise sensing data collected by a plurality of IoT devices.

7. The packet aggregation method of claim 1, wherein the plurality of IoT devices connect with the P4 switch.

8. A packet disaggregation method for a P4 switch, and the packet disaggregation method comprising following steps of:
receiving an aggregated packet by the P4 switch, and the aggregated packet being transmitted to an ingress parser of an ingress pipeline of the P4 switch;
parsing the aggregated packet to an Ethernet header, an IP header, a UDP header, a type header, a second flag header and a plurality of message headers by using a parse graph pre-defined in a switch configuration of the P4 switch, and the second flag header representing a number of the plurality of the message headers and a length of the plurality of the message headers;
cloning the Ethernet header, the IP header, the UDP header, the type header, the second flag header and a first message header of the plurality of message headers from the aggregated packet, and replacing the cloned second flag header with a first flag header, so as to disaggregate a packet from the aggregated packet, and the packet comprising the Ethernet header, the IP header, the UDP header, the type header, the first flag header and the first message header; and
deleting the first message header from the aggregated packet, modifying the second flag header for representing a number of an other of the message headers and a length of the other of the message headers, and recirculating the aggregated packet to the ingress pipeline by using an egress pipeline of the P4 switch, so as to disaggregate a next packet from the aggregated packet.

9. The packet disaggregation method of claim 8, further comprising:
when the number of the plurality of message headers is more than two, deleting the first message header from the aggregated packet, modifying the second flag header for representing the number of the other of the message headers and the length of the other of the message headers, and recirculating the aggregated packet to the ingress pipeline by using the egress pipeline of the P4 switch.

10. The packet disaggregation method of claim 9, further comprising:
when the number of the plurality of message headers is equal to two, deleting the first message header from the aggregated packet, and replacing the second flag header with the first flag header, so that the aggregated packet having the first flag header serves as the next packet, without recirculating the aggregated packet to the ingress pipeline by using the egress pipeline of the P4 switch.

* * * * *